Patented Oct. 5, 1954

2,691,031

UNITED STATES PATENT OFFICE 2,691,031

3-KETO-BISNOR-4-CHOLEN-11α,22-DIOL AND ESTERS

Herbert C. Murray, Hickory Corners, and Durey H. Peterson, Kalamazoo, Mich., assignors to The Upjohn Company, Kalamazoo, Mich., a corporation of Michigan No Drawing. Application July 1, 1952, Serial No. 296,726

6 Claims. (Cl. 260—397.45)

The present invention relates to 3-keto-bisnor-4-cholen-11α,22-diol and esters thereof.

The novel compounds of the present invention are represented by the formula:

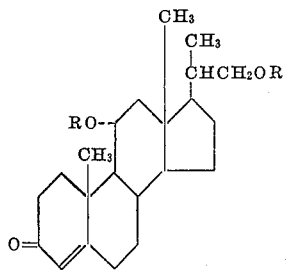

wherein R is hydrogen or a carboxylic acyl radical.

The 3-keto-bisnor-4-cholen-11α,22-diol of the present invention is prepared by exposing 3-keto-bisnor-4-cholen-22-al [Heyl et al., J. A. C. S. 72, 2617 (1950)] to the oxygenating action of a culture of fungus of the order Mucorales as described in Serial No. 296,725, filed July 1, 1952, now abandoned, and in our applications, of which this is a continuation-in-part, Serial No. 180,496, filed August 19, 1950, now abandoned, and Serial No. 272,944, filed February 23, 1952, issued July 8, 1952, as Patent No. 2,602,769.

It is an object of the present invention to prepare the novel 3-keto-bisnor-4-cholen-11α,22-diol and esters thereof. Other objects will be apparent to those skilled in the art to which the invention pertains.

The compounds of the present invention exhibit pharmacological utility such as anaesthetic and inhibitory properties in hypertensive, estrogenic, testoid, folliculoid, and progesterone activities. Furthermore the esters of the present invention are readily purified derivatives of 3-keto-bisnor-4-cholen-11α,22-diol and are useful chemical intermediates. The esters of the present invention may be converted to 11-dehydroprogesterone [Hegner et al., Helv. Chim. Acta, 26, 715 (1943)], having progestional activity, by pyrolysis of the 11-acylate to produce 22-acyloxy-bisnor-4,11-choladiene-3-one followed by hydrolysis of the 22-ester and oxidation of the resulting hydroxyl to yield 3-keto-bisnor-4,11-choladienic acid. The resulting acid may be reacted with ethyl mercaptan to produce the thiol ester of the acid and the resulting thiol ester may be treated with deactivated Raney nickel to form an aldehyde which is reacted with a secondary amine, e. g., with piperidine in benzene in the presence of para-toluenesulfonic acid, and the thus-produced enamine is ozonized with ozone whereupon the resulting ozonide is split with zinc in acetic acid to produce 11-dehydroprogesterone.

The 3-keto-bisnor-4-cholen-11α,22-diol may be utilized for the preparation of 11α-hydroxyprogesterone [Peterson et al., J. A. C. S., 74, 1871 (1952)] by reaction with chromium trioxide in acetic acid to yield 3,11-diketo-bisnor-4-cholenic acid and reacting the thus produced compound with ethyl mercaptan to produce the thiol ester of the 3,11-diketo-bisnor-4-cholenic acid. The thiol ester is treated with deactivated Raney nickel to form an aldehyde which is reacted with a secondary amine, e. g., with piperidine in benzene in the presence of para-toluenesulfonic acid, and the thus-produced enamine is ozonized with ozone whereupon the resulting ozonide is split with zinc in acetic acid to produce 11α-hydroxyprogesterone.

In carrying out the process of the present invention, the starting 3-keto-bisnor-4-cholen-11α,22-diol is admixed with an acylating agent such as, for example, ketene, a ketene of a selected acid, an acid, acid chloride or acid anhydride, or other known acylating agent, usually in a solvent such as, for example, pyridine or the like, or in an inert solvent, including solvents like benzene, toluene, ether, and the like, and heated at a temperature between about zero degrees centigrade and the boiling point of the reaction mixture, usually about room temperature, for a period between about a half-hour and about 96 hours. The time of reaction may be varied according to the temperature at which the reaction is carried out, the particular acylating agent utilized, and the ratio of reactants used. The reaction mixture is suitably cooled with ice or cold water, the product collected in an appropriate solvent which is thereafter washed with successive portions of a mildly basic solution and water to obtain a solution of the product which is essentially neutral. In some instances, the product may crystallize from the reaction mixture, in which case it may be advantageous to separate the product by filtration or other means, wash with water, and thereafter purify by conventional means, such as, for example, by crystallization from a suitable solvent or by chromatographic purification as deemed necessary. The thus-described acylation process produces both the 22-mono-ester and the 11α,22-di-ester, although in different proportions, depending upon the proportions of acylating agent to 3-keto-bisnor-4-cholen-11α,22-diol. With approximately one molar equivalent of acylating agent to said steroid there is produced predominantly the mono-acylated product, whereas with about two molar equivalents or more of acylating agent to said steroid, the predominate product is the diacylated product. If a mixed ester involving two different acyl groups is desired the 3-keto-bisnor-4-cholen-11α,22-diol may be partially esterified with one acylating agent and the resulting monoester may then be completely esterified with an acylating agent which introduces a different acyl group. Thus 11α-dimethylacetoxy-22-β-cyclopentylpropionyloxy - 3 - keto - bisnor - 4 - cholen or other mixed esters of the herein mentioned acid groups may be prepared.

*Example 1.—3-keto-bisnor-4-cholen-11α,22-diol*

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Twelve liters of this sterilized medium was inoculated with *Rhizopus nigricans* ATCC 6227b, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24 hour growth of *Rhizopus nigricans* minus strain was added three grams of 3-keto-bisnor-4-cholen-22-al in 200 mililiters of ethanol to provide a suspension of the steroid in the culture. After an additional 48 hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively three times with three-liter portions of methylene chloride. The combined methylene chloride extracts were washed twice with 750 milliliters of two percent aqueous solution of sodium bicarbonate and twice with 750 milliliters of water. After drying the methylene chloride extracts with about three to five grams of anhydrous sodium sulfate per liter of solvent and filtering, the solvent was removed by distillation to produce 4.03 grams of semi-crystalline residue. The extract was dissolved in 400 milliliters of ethylene dichloride and chromatographed over 320 grams of Florisil synthetic magnesium silicate using 500-milliliter portions of developing solvents in accordance with Table I.

Fractions 11 to 16, inclusive, were combined and recrystallized from ten milliliters of acetone by dropwise addition of ether until recrystallization was initiated. The crystals were separated and again recrystallized from ten milliliters of acetone to give 550.5 milligrams of 3-keto-bisnor-4-cholen-11α,22-diol, melting at 130 to 133 degrees centigrade. The infrared spectrum indicated the presence of two hydroxy groups and the disappearance of the aldehyde group. The optical rotation $[\alpha]_D^{23}$ was plus 78 degrees (1.0175 in chloroform), and the ultraviolet extinction $k_{243}$ was 38.39.

*Analysis.*—Calculated for $C_{22}H_{34}O_3$: C, 76.26; H, 9.89. Found: C, 75.86; H, 9.77.

TABLE I

| Fraction | Solvent | Eluate Solids, Milligrams |
|---|---|---|
| 1 | ethylene dichloride | 194.0 |
| 2 | do | 60.5 |
| 3 | ethylene dichloride-acetone 25:1 | 335.0 |
| 4 | do | 134.0 |
| 5 | ethylene dichloride-acetone 15:1 | 199.5 |
| 6 | do | 116.0 |
| 7 | do | 51.0 |
| 8 | ethylene dichloride-acetone 12:1 | 31.0 |
| 9 | do | 28.0 |
| 10 | ethylene dichloride-acetone 10:1 | 54.0 |
| 11 | do | 87.5 |
| 12 | do | 132.5 |
| 13 | ethylene dichloride-acetone 8:1 | 234.5 |
| 14 | do | 249.0 |
| 15 | do | 264.0 |
| 16 | ethylene dichloride-acetone 5:1 | 375.0 |
| 17 | do | 266.5 |
| 18 | do | 192.0 |
| 19 | ethylene dichloride-acetone 2:1 | 440.5 |
| 20 | do | 179.5 |
| 21 | do | 81.0 |
| 22 | acetone | 91.5 |

*Example 2.—11α,22-diacetoxy-3-keto-bisnor-4-cholen*

To a 48 milligram sample of 3-keto-bisnor-4-cholen-11α,22-diol dissolved in two milliliters of pyridine was added three milliliters of cold acetic anhydride and the reaction mixture maintained at room temperature for eighteen hours. The reaction mixture was thereupon diluted with fifty milliliters of ice water, extracted three times with thirty milliliters of ether and the ether extracts washed three times with ten milliliters of five percent hydrochloric acid, three times with ten milliliters of five percent sodium hydroxide and five times with water. Upon drying over five grams of sodium sulfate and evaporating at room temperature, 53 milligrams of crystals, having a melting point of 125 to 126 degrees centigrade was obtained. Two recrystallizations from two milliliters of ether to which hexane was added, gave 38.5 milligrams of 11α,22-diacetoxy-3-keto-bisnor-4-cholen having a melting point of 127 to 128 degrees centigrade. The infrared spectrum showed that both hydroxy groups were acetylated. The optical rotation $[\alpha]_D^{23}$ was plus 52 degrees (0.837 in chloroform) and the ultraviolet extinction $k_{242}$ was 33.95.

*Analysis.*—Calculated for $C_{26}H_{38}O_5$: C, 72.52; H, 8.90. Found: C, 72.64; H, 8.73.

*Example 3.—11α,22-dipropionyloxy - 3 - keto-bisnor-4-cholen*

In the same manner as given in Example 2, 11α,22 - dipropionyloxy-3-keto-bisnor-4-cholen is prepared using an equivalent proportion of propionic anhydride in place of acetic anhydride.

*Example 4.—11α,22 - di(β - cyclopentylpropionyloxy)-3-keto-bisnor-4-cholen*

In the same manner as given in Example 2, 11α,22-di(β-cyclopentylpropionyloxy) - 3 - keto-bisnor-4-cholen is prepared using equivalent proportions of β-cyclopentylpropionyl chloride in place of acetic anhydride.

*Example 5.—11α,22 - dibenzoxy - 3 - keto-bisnor-4-cholen*

In the same manner as given in Example 2, 11α,22-dibenzoxy-3-keto-bisnor-4-cholen is prepared using equivalent proportions of benzoyl chloride in place of acetic anhydride.

*Example 6.—11α,22-dioctanoyloxy-3-keto-bisnor-4-cholen*

In the same manner as given in Example 2, 11α,22-dioctanoyloxy-3-keto-bisnor-4-cholen is prepared using equivalent proportions of octanoic anhydride in place of acetic anhydride.

In a similar manner other mono- or di-esters of 3-keto-bisnor-4-cholen-11α,22-diol are prepared according to acylation procedures illustrated by the examples above or by reaction with ketene, ketenes of selected acids, selected acids, acid anhydrides, or acid chlorides, in an organic solvent such as pyridine or the like. Representative esters thus-prepared include one to eight carbon atom carboxylic acid acyloxy esters of saturated or unsaturated aliphatic, carbocyclic, cycloaliphatic, aryl, arylalkyl, alkaryl, mono-, di-, or poly-carboxylic acids which form ester groups such as, for example, formyloxy, acetoxy, propionyloxy, dimethylacetoxy, trimethylacetoxy, butyryloxy, valeryloxy, hexanoyloxy, cyclopentylformyloxy, acryloxy, cyclohexylformyloxy, β-cyclopentylpropionyloxy, the half and di-esters of malonic, maleic, succinic, glutaric, and adipic acids, and the like. The acids may also contain non-interfering substituents, such as mono or poly halo, chloro, bromo, hydroxy, methoxy, and the like.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A compound selected from the group consisting of 3-keto-bisnor-4-cholen-11α,22-diol and the 3-keto-bisnor-4-cholen-11α,22-diol esters of hydrocarbon carboxylic acids containing less than nine carbon atoms.
2. 11α,22-diacetoxy-3-keto-bisnor-4-cholen.
3. 11α,22 - dipropionyloxy - 3 - keto-bisnor-4-cholen.
4. 11α,22 - di(β - cyclopentylpropionyloxy) - 3-keto-bisnor-4-cholen.
5. 11α, 22-dibenzoxy-3-keto-bisnor-4-cholen.
6. 3-keto-bisnor-4-cholen-11α,22-diol.

References Cited in the file of this patent

UNITED STATES PATENTS

| Number | Name | Date |
|---|---|---|
| 2,316,142 | Cartland | Apr. 6, 1943 |

OTHER REFERENCES

Fieser et al.: Natural Products Related to Phenanthrene, 3rd ed., page 408 (1949).